(12) United States Patent
Berard et al.

(10) Patent No.: US 11,962,933 B2
(45) Date of Patent: Apr. 16, 2024

(54) DEVICE WITH GLAZING AND ASSOCIATED THERMAL CAMERA, AND OPTIMIZATION METHODS

(71) Applicant: SAINT-GOBAIN GLASS FRANCE, Courbevoie (FR)

(72) Inventors: Mathieu Berard, Paris (FR); Keihann Yavari, Margny-les-Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 98 days.

(21) Appl. No.: 17/790,662

(22) PCT Filed: Dec. 23, 2020

(86) PCT No.: PCT/FR2020/052616
§ 371 (c)(1),
(2) Date: Jul. 1, 2022

(87) PCT Pub. No.: WO2021/136909
PCT Pub. Date: Jul. 8, 2021

(65) Prior Publication Data
US 2023/0074901 A1 Mar. 9, 2023

(30) Foreign Application Priority Data

Jan. 3, 2020 (FR) .................................... 2000019

(51) Int. Cl.
*H04N 5/33* (2023.01)
*B60J 1/02* (2006.01)
*B60R 11/04* (2006.01)
*B60R 11/00* (2006.01)

(52) U.S. Cl.
CPC .................. *H04N 5/33* (2013.01); *B60J 1/02* (2013.01); *B60R 11/04* (2013.01); *B60R 2011/0026* (2013.01)

(58) Field of Classification Search
CPC ............... H04N 5/33; B60J 1/02; B60R 11/04
USPC ........................................................ 348/148
See application file for complete search history.

(56) References Cited

U.S. PATENT DOCUMENTS

| 6,132,882 | A | 10/2000 | Landin et al. |
| 2007/0216768 | A1 | 9/2007 | Smith et al. |
| 2011/0027515 | A1 | 2/2011 | Melcher et al. |
| 2014/0198379 | A1 | 7/2014 | Akedo et al. |
| 2016/0144797 | A1 | 5/2016 | Hoellt et al. |

FOREIGN PATENT DOCUMENTS

| CN | 101037099 A | 9/2007 |
| CN | 201808255 U | 4/2011 |
| CN | 110218006 A | 9/2019 |
| GB | 2 271 139 A | 4/1994 |

OTHER PUBLICATIONS

Search Report as issued in Chinese Patent Application No. 202080006256.7, dated Aug. 17, 2022.
International Search Report as issued in International Patent Application No. PCT/FR2020/052616, dated May 11, 2021.

*Primary Examiner* — Nguyen T Truong
(74) *Attorney, Agent, or Firm* — Pillsbury Winthrop Shaw Pittman LLP

(57) ABSTRACT

A device includes a vehicle glazing, including, in a peripheral zone, a through-hole including an insert and a thermal camera.

20 Claims, 13 Drawing Sheets

Figure 3:
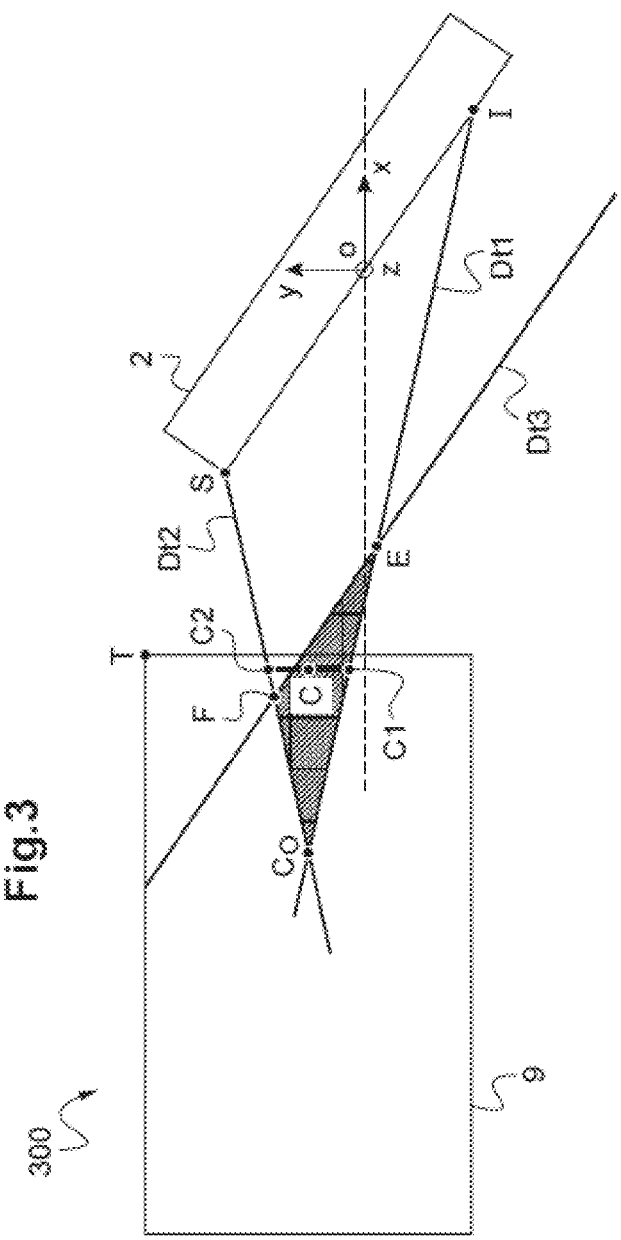

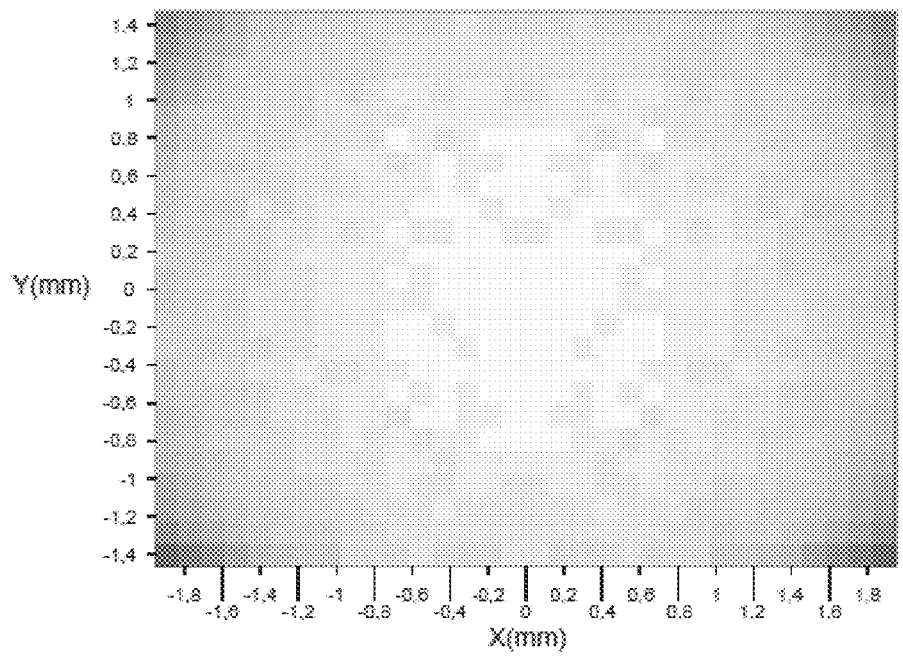
Fig.3'
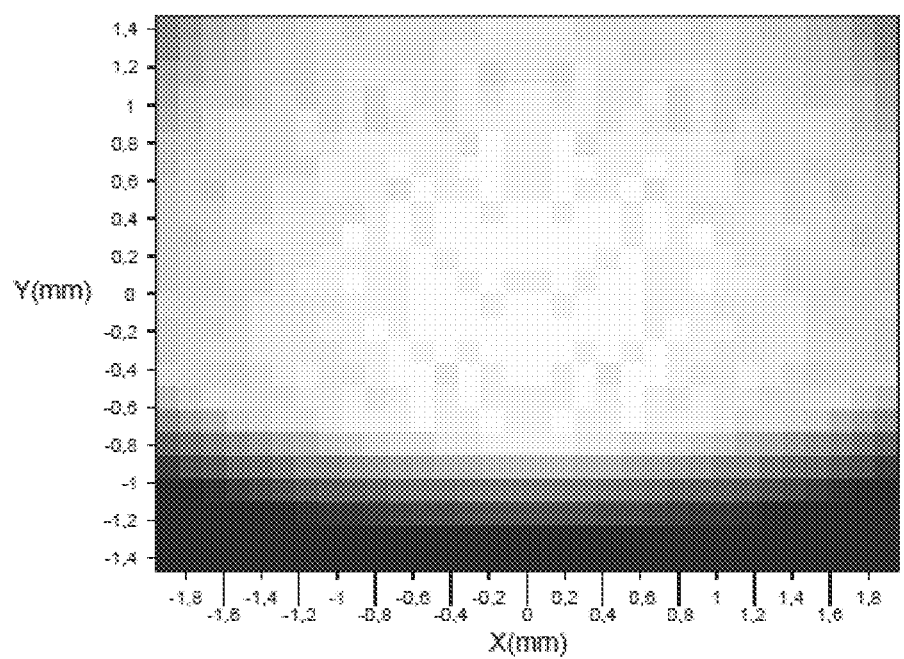
Fig.3"

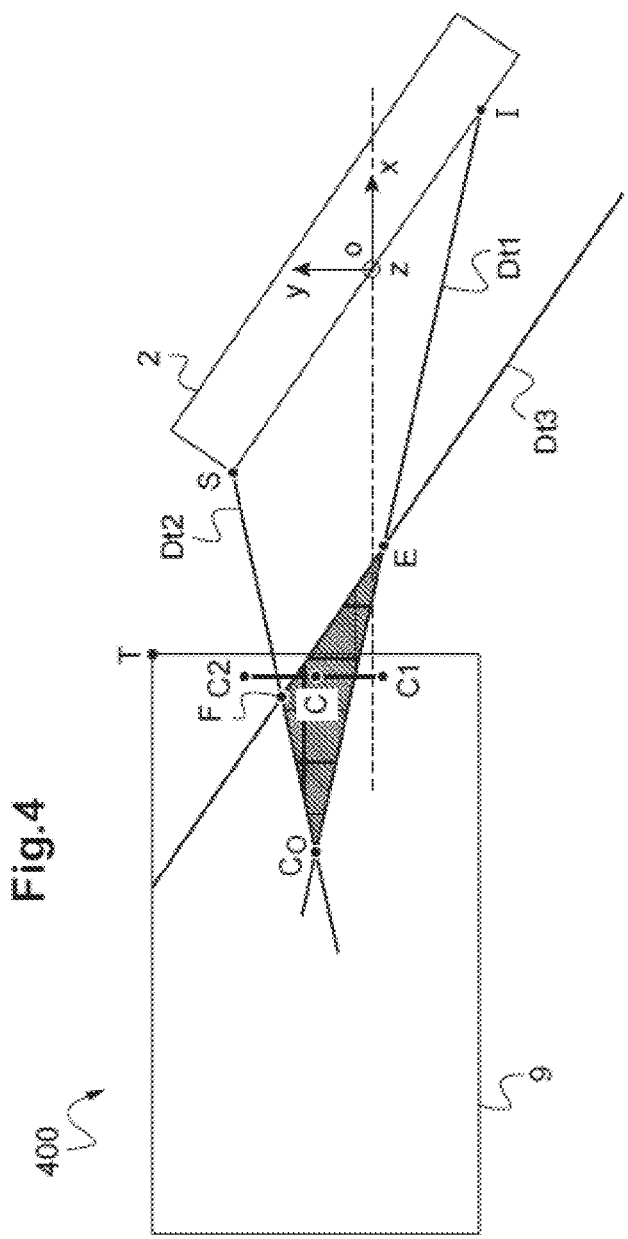

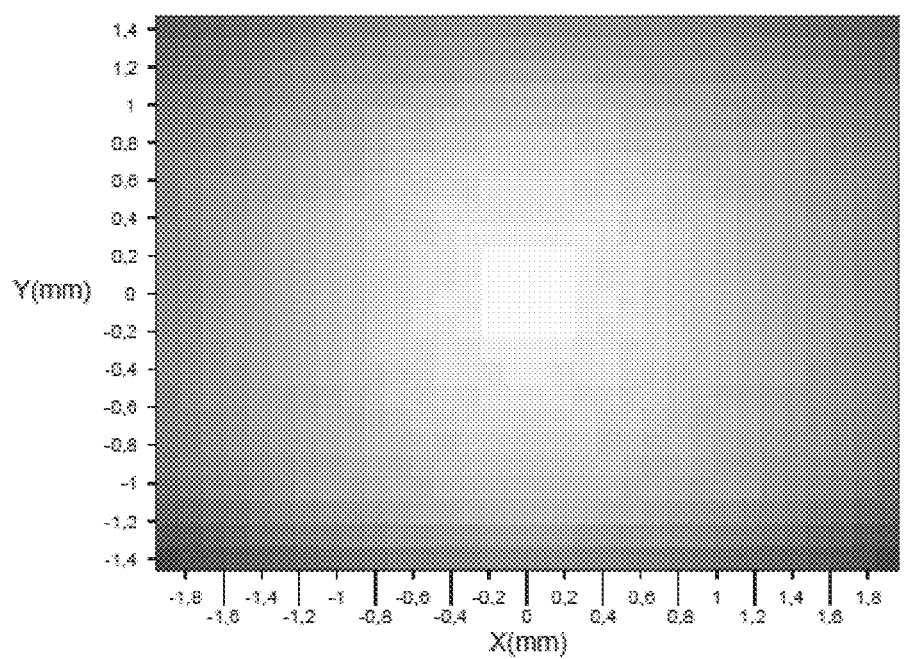

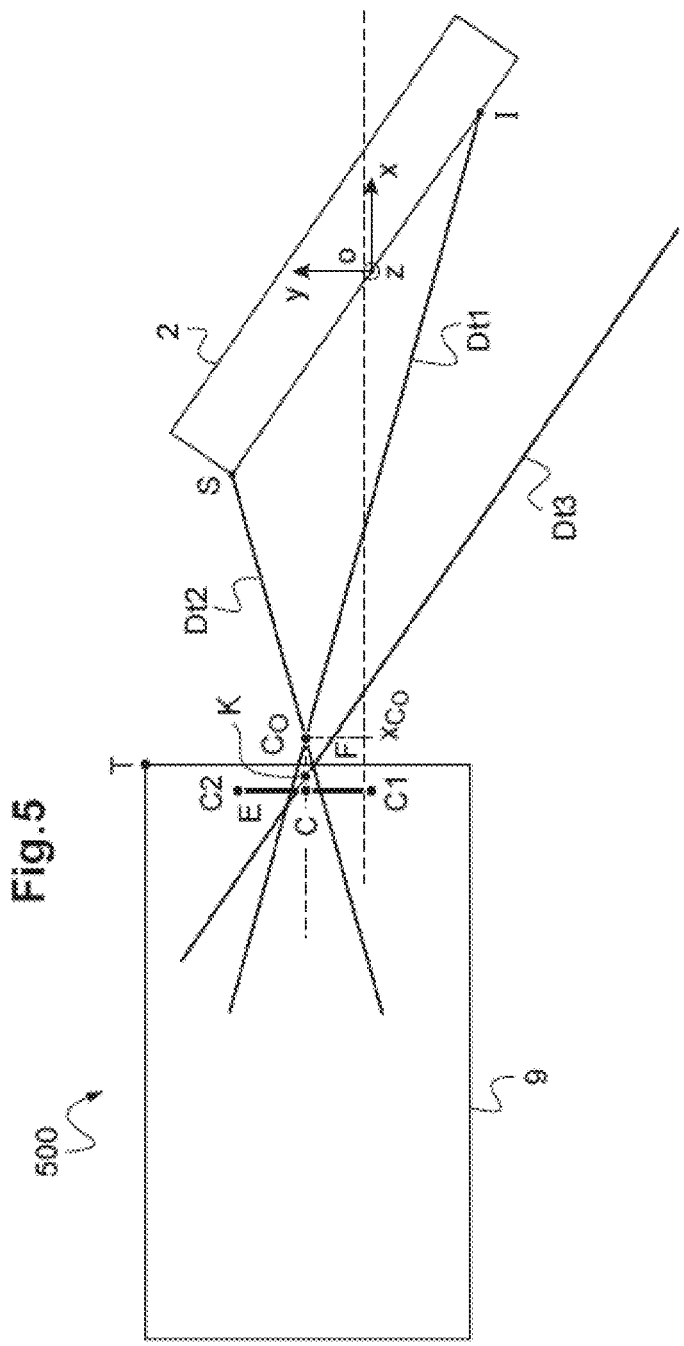

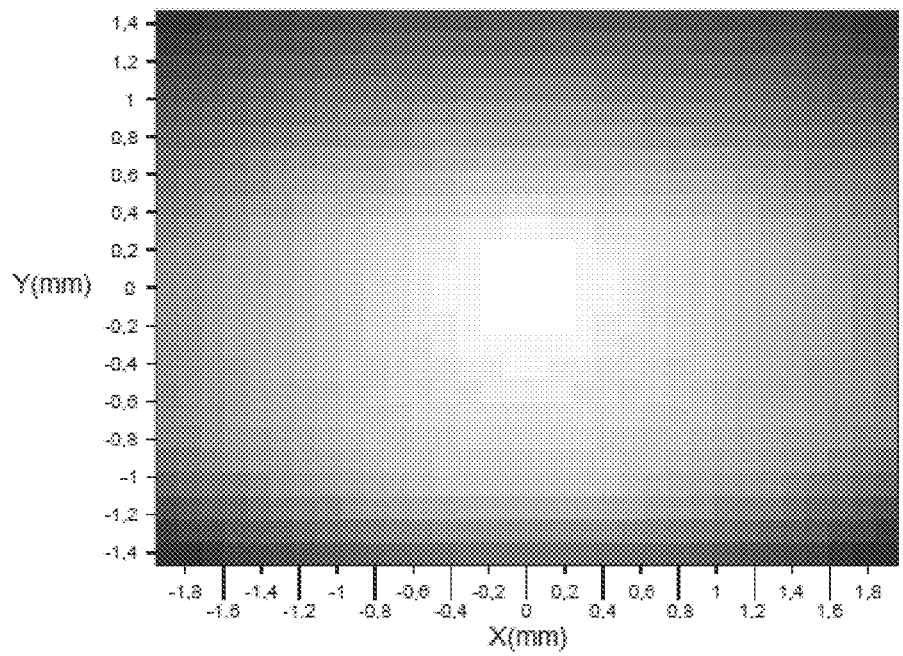
[FIG.6a]
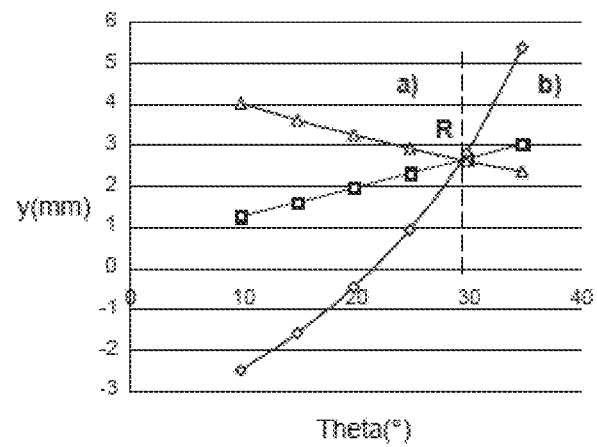

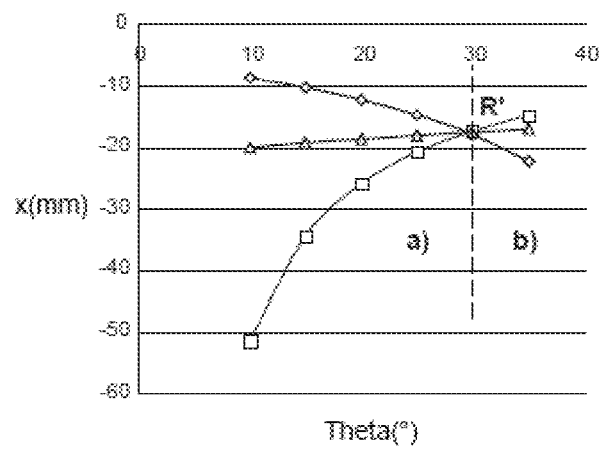
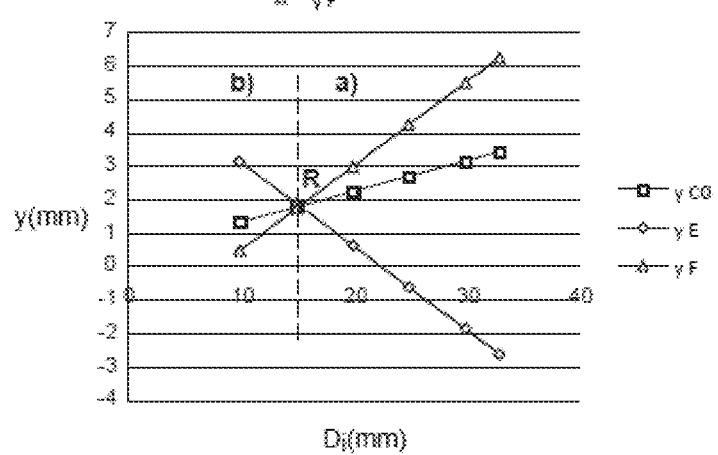

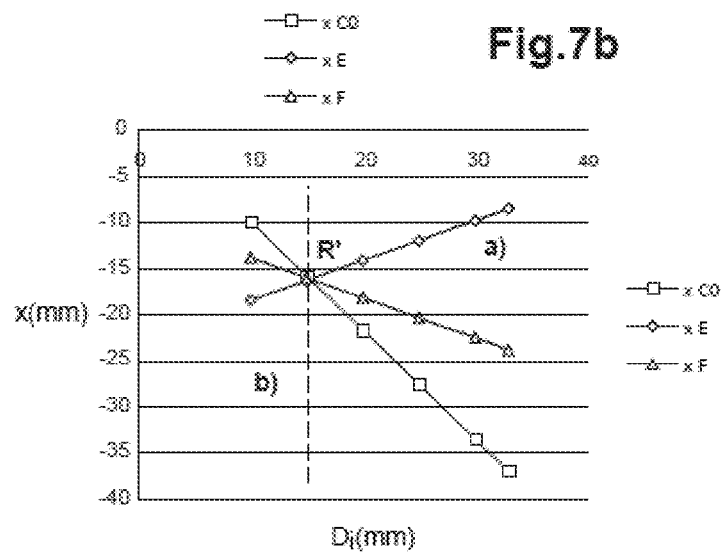
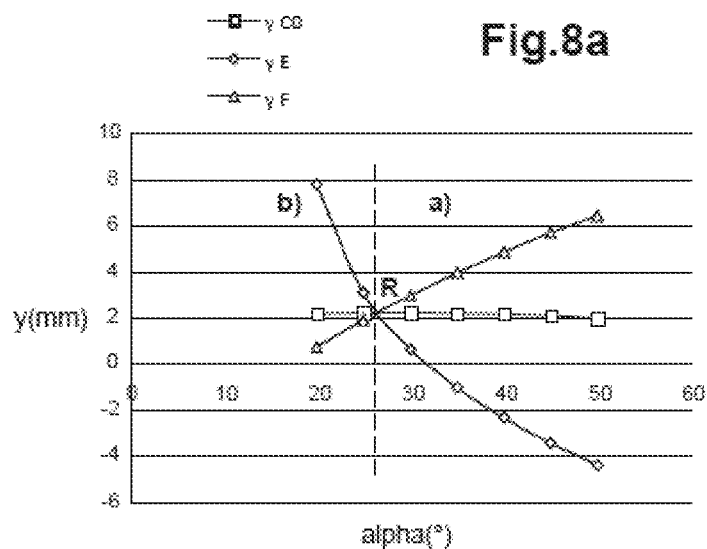

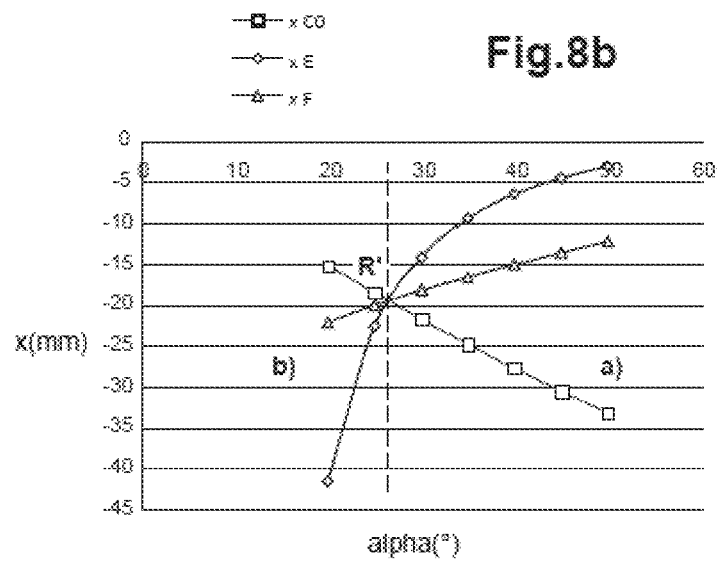
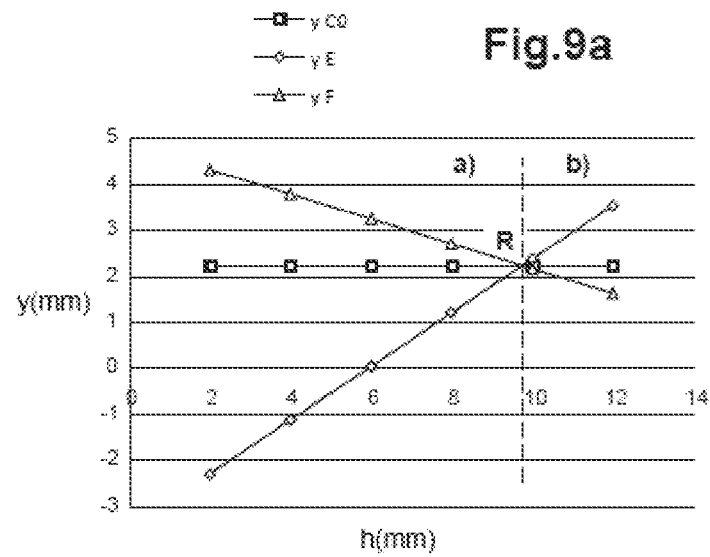

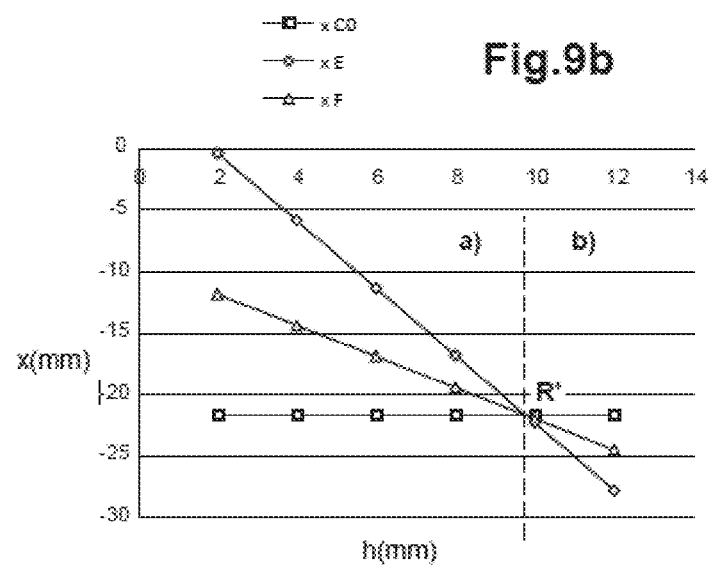
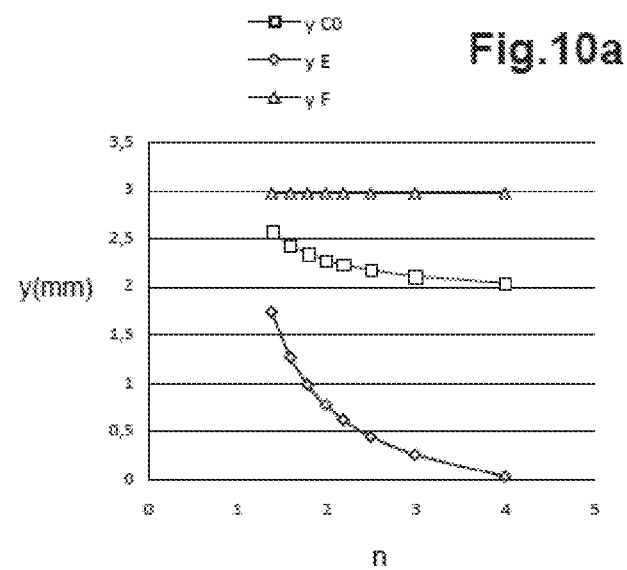

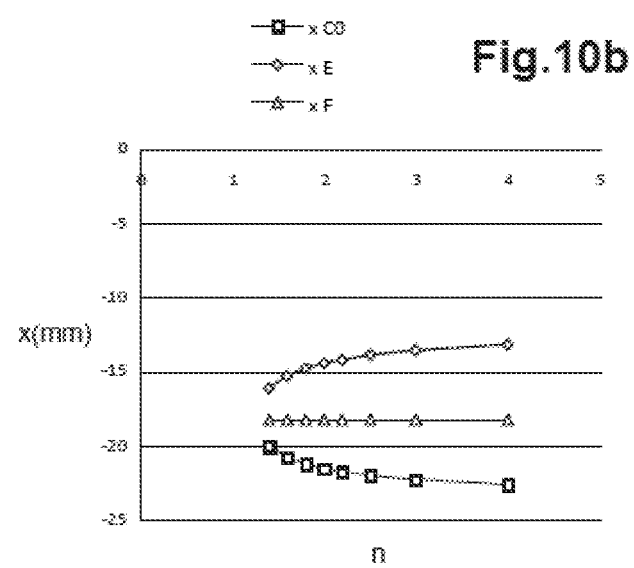

DEVICE WITH GLAZING AND ASSOCIATED THERMAL CAMERA, AND OPTIMIZATION METHODS

CROSS-REFERENCE TO RELATED APPLICATIONS

This application is the U.S. National Stage of PCT/FR2020/052616, filed Dec. 23, 2020, which in turn claims priority to French patent application number 2000019 filed Jan. 3, 2020. The content of these applications are incorporated herein by reference in their entireties.

The invention relates to a device combining glazing, in particular a windshield, in a motor vehicle, of the train or of an airplane, and said thermal camera for such a display of information.

The glazings for vehicles and the associated technology are constantly evolving, notably to improve safety.

In particular, the patent GB2271139 proposes a windshield comprising a laminated glazing with, in a central part and close to the top longitudinal edge, an aperture filled with an insert made of a material that is highly transparent to the thermal infrareds, more specifically made of zinc sulfide (ZnS) with a transmission of at least 50% from 5 to 15 µm. A dedicated camera coupled to a screen that is visible to the driver is in the vehicle interior facing the insert. The hole is circular and the insert is a disk glued to the walls of the hole.

In production terms, the hole is made before the windshield glass passes into the autoclave.

The object or person detection performance levels of such a device can be enhanced. To this end,
the present invention relates to a device which comprises:
a glazing (notably laminated and/or bent) of a vehicle, notably a motor vehicle (car, truck, public transportation: bus, car, etc.) or a railway vehicle (in particular with a maximum speed of at most 90 km/h or at most 70 km/h, in particular metros, tramways), in particular a windshield, back window, sidelight, of given thickness E1 (subcentimetric notably of at most 5 mm for a motor vehicle windshield), the glazing having an outer main face (called F1) oriented toward the outside and an inner(most) main face on the vehicle interior side (called F4 if laminated glazing, or called F2), the glazing comprising, in a peripheral zone, preferably in the upper part of the glazing (preferably at the top longitudinal edge, notably in a central region of the upper part), a through-hole between the inner face and the outer face, the hole being delimited by a side wall of the glazing, notably an open-ended hole forming a peripheral notch or a closed hole (surrounded by the wall), in particular the hole of constant diameter or a wider diameter on the inner face than on the outer face), notably of convex cross section, in particular circular or oval or ellipsoidal or even rectangular, square or hexagonal,
in said through-hole, an insert (flat or domed, with an outer face F1, even also with a protruding inner face, F2, or respectively F4 if laminated glazing) made of a material that is transparent in a range A of wavelengths in the infrared spectrum beyond 2.5 µm, ranging at least from 9.5 to 10.5 µm and preferably from 8 to 12 µm, the insert being of given thickness e, notably from 3 to 10 mm, made of a material of refractive index n in the range A, notably of 1.35 to 4.5, with an input face oriented toward the vehicle interior (flush with or set back from the inner face) and an output face (flush with or set back from the outer face),
the insert, being preferably of circular or quasi-circular form, the input face fitting within a rectangle or square of width Wi and height Di with aspect radio Di/Wi of at least 0.8 or 0.9 and at most 1.1 or 1.2, preferably Di>Wi, with Di at most 35 mm, notably at least 5 mm or 8 mm, defining a center O which is the intersection of the diagonals of said rectangle,
a so-called thermal camera, disposed on the inner face side so as to receive an electromagnetic radiation after passing through said insert, the thermal camera comprising an input pupil, notably circular, with a height p, (diameter generally) and an infrared detection system in the range A, for example by microbolometry, notably without cryogenic cooling and a lens, the camera being defined by:
an optical axis X' passing through the center C of the pupil, C facing the insert,
a vertical viewing angle $\theta$ of at least 10° or 20° and in particular at most 70° or 60°.

The camera is of given volume defined by a point of contact T (a wedge/upper front-end plane of the lens/in front of or behind the lens) capable of touching the glazing first, or a plate on the inner face of the glazing, or the insert, or a piece in the peripheral environment of said glazing, in position mounted in a vehicle.

An orthogonal reference frame (O, X, Y, Z) is defined, in which X is an axis parallel to the optical axis X', oriented toward the outer face, Z is the axis normal to the optical axis, the axis Y is normal to X in the plane containing P0 oriented toward the top of the glazing, Z is normal to P0.

T being in a plane P0 passing through O and C, or Tv, called virtual point of contact, is defined as being the projection of Tin said plane P0, w being the distance according to X and algebraic in the plane P0 from T or Tv and h is the distance according to Y in the plane P0 between C and T or Tv.

The input face of the insert has an inclination defined by an angle $\alpha$ with respect to X.

A first straight line Dt1 is defined $$y = -\tan\left(\frac{\theta}{2}\right)x + \frac{\left(\cos\alpha\tan\left(\frac{\theta}{2}\right) - \sin\alpha\right)\left[D_i\sqrt{1 - \frac{1}{n^2}\cos^2\left(\alpha - \frac{\theta}{2}\right)} - 2\frac{e}{n}\cos\left(\alpha - \frac{\theta}{2}\right)\right]}{2\sqrt{1 - \frac{1}{n^2}\cos^2\left(\alpha - \frac{\theta}{2}\right)}} \quad \text{[Math 1]}$$

A second straight light Dt2 is defined $$y = \tan\left(\frac{\theta}{2}\right)x + \frac{D_i}{2}\left[\cos\alpha\tan\left(\frac{\theta}{2}\right) + \sin\alpha\right] \quad \text{[Math 2]}$$

Dt1 and Dt2 are secant at C0 ($x_{C0}$, $y_{C0}$) with $$x_{C_O} = -\frac{\sin\alpha\left[D_i\sqrt{1-\frac{1}{n^2}\cos^2\left(\alpha-\frac{\theta}{2}\right)}-\frac{e}{n}\cos\left(\alpha-\frac{\theta}{2}\right)\right]+\frac{e}{n}\cos\alpha\tan\left(\frac{\theta}{2}\right)\cos\left(\alpha-\frac{\theta}{2}\right)}{2\tan\left(\frac{\theta}{2}\right)\sqrt{1-\frac{1}{n^2}\cos^2\left(\alpha-\frac{\theta}{2}\right)}} \quad \text{[Math 3]}$$

$$y_{C_O} = \tan\left(\frac{\theta}{2}\right)x_{C_O} + \frac{D_i}{2}\left[\cos\alpha\tan\left(\frac{\theta}{2}\right)+\sin\alpha\right] \quad \text{[Math 4]}$$

A third straight line Dt3 is defined $y=-\tan(\alpha)(x+w)-h$ [Math 5]

Dt1 and Dt3 are secant at $E(x_E, y_E)$,
Dt2 and Dt3 are secant at $F(x_F, y_F)$ $$x_F = -\frac{D_I\cos\alpha\tan\frac{\theta}{2}+D_I\sin\alpha+2w\tan\alpha+2h}{2\left(\tan\alpha+\tan\frac{\theta}{2}\right)} \quad \text{[Math 6]}$$

$$y_F = \tan\left(\frac{\theta}{2}\right)x_F + \frac{D_i}{2}\left[\cos\alpha\tan\left(\frac{\theta}{2}\right)+\sin\alpha\right] \quad \text{[Math 7]}$$

$$x_E = -\frac{\left(\cos\alpha\tan\left(\frac{\theta}{2}\right)-\sin\alpha\right)\left[D_i\sqrt{1-\frac{1}{n^2}\cos^2\left(\alpha-\frac{\theta}{2}\right)}-2\frac{e}{n}\cos\left(\alpha-\frac{\theta}{2}\right)\right]}{2\sqrt{1-\frac{1}{n^2}\cos^2\left(\alpha-\frac{\theta}{2}\right)}}+w\tan\alpha+h}{\tan\alpha-\tan\frac{\theta}{2}} \quad \text{[Math 8]}$$

$y_E=-\tan(\alpha)(x_E+w)-h$ [Math 9]

$x_C$ being a negative value, $y_C$ being a positive value, the camera being in contact by the point T or spaced apart.

In a case a), $y_F > y_{C0} > y_E$
and C ($x_C$, $y_C$) is inside a triangle of vertices C0 ($x_{C0}$, $y_{C0}$) $F(x_F, y_F)$ and $E(x_E, y_E)$, at least 50% of the pupil being positioned in said triangle by including E.

In a case b) when $|x_{C0}| < |x_F|$ [Math 10]

then $y_C < (y_{C0}+5 \text{ mm})$.

A point K of intersection is then defined between a straight line $y=y_{C0}$ and Dt3, therefore $$x_K = w - \frac{y_{C0}-h}{\tan(\alpha)} \quad \text{[Math 11]}$$

$y_K = y_{C0}$ [Math 12]

e $|x_K i - x_{C0}| < 10$ mm, [Math 13]

even $|x_K - x_{C0}| < 8$ mm. [Math 14]

The center of the input pupil of the camera, that is to say the center of the diaphragm of the camera as seen from the outside, is defined. To optimize to the maximum the position of the camera in order to maximize the field of view, three constraints must be observed:

a constraint to be observed not to reduce downward vertical field of view (optical constraint)

a constraint to be observed not to reduce upward vertical field of view (optical constraint)

a constraint for the lens not to tap in the windshield (mechanical constraint).

The limit case of each of these constraints defines the three straight lines Dt1, Dt2, Dt3 in the cases where the three constraints can be observed these three straight lines define a triangle in the vertical plane. It is desired that the center of the pupil of the camera is situated within this triangle.

On the horizontal, the inclination of the windshield has little effect and therefore it is not assigned the horizontal field of view. What is more, because the inclination of the windshield is on the vertical and not in the other direction, the camera is placed in the middle for symmetry on the left-right axis and therefore no optimization is required. The optimization is therefore solely on the vertical placement.

$y_{C0}$ is derived from the optical constraints and not mechanical constraints, so its value is therefore independent of w and h.

With f being the focal length of the camera, also, with $h_{sensor}$ the height of the sensor and $\theta$ the vertical viewing angle of the camera $$\theta = 2\tan^{-1}\frac{2f}{h_{sensor}} \quad \text{[Math 15]}$$

Note that p is equal to f/N.

An infrared detection is preferred with a maximum sensitivity in the range A and even a weak sensitivity beyond 15 or 14 μm and below 7 or 6 μm.

An example of thermal camera that can be cited is the product Atom® 1024 from the company Lynred USA.

Advantageously:

in the case a), at least 70%, 80%, 90% or even 100% of the pupil is positioned in said triangle C0FE by including E in the case a)

$y_{C0}-2$ mm $< y_C < y_{C0}-0.5$ mm or even $y_{C0}-1$ mm $< y_C < y_{C0}-0.5$ mm and $x_F-5$ mm$<x_C<x_F+2$ mm and even $x_F-5$ mm$<x_C<x_F+1$ mm $\theta$ is at least 20° and in particular at most 50°

Di is at most 20 mm w goes in absolute value from 1 mm to 10 cm h goes from 1 mm to 2 cm.

In particular:

$y_C<10$ mm and/or $|x_C|<5$ cm.

For the case a):

for C0: $y_{C0}$ from 0.8 mm to 3.2 mm and $x_{C0}$ −40 mm to −10 mm for E: $y_E<4/3$ mm xE at least −20 mm and at most 3 mm and for F: $y_F<7$ mm $x_F$ −25 mm to −10 mm.

For the case b):

$y_{C0}$ goes from 1 mm to 3 mm.

If there is a preference not to "tilt" the camera too much with respect to the horizontal, therefore an X' (or X) is chosen that is inclined by at most 30°, 20°, 10°, 5° with the horizontal and/or by at most an angle equal to $\theta/2\pm2°$ or $\pm1°$.

The range A goes from 9.5 μm to 10.5 μm, preferably from 8 to 12 μm or 13 μm, preferably with a light transmission of at least 50% and, better, at least 60%, 65% or 70% in this range A.

And, preferably, there are, between the insert and the lateral wall, means for fixing the insert (and also preferably water-tight and even gas-tight), notably in the form of a ring made of organic polymer material (or hybrid organic/inorganic) and/or flexible material, for example polycarbonate.

According to the invention, in addition, the material of the insert can be germanium or a ZnS (classic).

According to the invention, in addition, the material of the insert can be transparent in the visible at a reference wavelength lying preferably between 500 nm and 600 nm and even 540 or 550 nm to 600 nm, better, in a range B from 550 to 600 nm, preferably with a light transmission of at least 25% and, better, at least 30% or, even better, 40%, 60% in the range B.

Contrary to the classic ZnS which is opaque in the visible spectrum, the material of the insert according to the invention can be transparent in the visible which makes it possible:

to identify the faults in the crystal simply, thus limiting the scrap rate correctly pre-sight the optical system (with a so-called thermal camera sensitive in the reference wavelength).

The light transmission is measured for the reference wavelength or, better, for the range B with a spectrophotometer such as the Perkin Elmer Lambda-35.

The light transmission can be measured according to the standard ISO 9050:2003 by using the illuminant D65, and be the total transmission (notably integrated in the visible range and weighted by the sensitivity curve of the human eye), taking account both of the direct transmission and the possible diffuse transmission, the measurement being done for example using a spectrophotometer provided with an integrated sphere, the measurement at a given thickness being then converted if necessary to the reference thickness of 4 mm according to the standard ISO 9050:2003.

The infrared optical transmission is measured for the range A by a Fourier spectrometer such as the BrukerVertex-70.

Advantageously, the material of the insert exhibits:

an infrared optical transmission of at least 50% and, better, at least 60%, 65% or 70% in the range A, notably a variation of infrared optical transmission of at most 5% or 3% or 2% (flat spectrum) in the range A and a light transmission of at least 25% and, better, at least 30% or even 40%, 60% in the range B, notably a variation of light transmission of at most 5% or 2% (flat spectrum) in the range B.

The insert is for example of neutral color or tinted (while remaining transparent) notably yellow or orange.

The material of the insert can be polished (outer and inner faces).

Advantageously, the material of the insert according to the invention is chosen from among a material (preferably polycrystalline), obtained in particular by chemical vapor deposition as follows:

a compound of zinc including selenium and/or sulfur, or a compound including barium fluoride or even a compound including thallium bromide-iodide such as that of KRS-5 type (Thallium Bromide-Iodide).

And in particular the material of the insert is chosen from among:

a compound including multispectral zinc sulfide, in particular obtained after hot isostatic pressing (treatment by an isostatic press at the temperature preferably of at least 800° C.), notably including selenium, such as $ZnS_xSe_{1-x}$ with x preferably at least 0.97, or better, at least 0.99, and even better, at least 0.998 a compound including a zinc selenide, in particular ZnSe, a compound including a barium fluoride, in particular $BaF_2$.

The zinc sulfide with a multispectral (MS) grade is a recent material. It can be polycrystalline and obtained by implementing (notably after formation by chemical vapor deposition CVD from zinc vapor and $H_2S$ gas) a hot isostatic pressing (HIP).

The transmission of the multispectral zinc sulfide can be wide spectrum with a flat spectrum. The transmission is in particular greater than 60% from 0.5 μm to 10 μm.

The refractive index of the multispectral ZnS is, for example, between 2.1 and 2.3 in the range A and in the visible between 2.3 and 2.6.

The multispectral, and preferably polycrystalline, zinc sulfide is advantageous in light of its combination of optical and mechanical properties and chemical resistance.

The best known polycrystalline multispectral zinc sulfide is Cleartran™.

The multispectral ZnS product sold by the company II-VI or Crystaltechno Ltd can be cited.

Vendors of polycrystalline zinc selenide that can be cited include the companies Hellma, II-VI or Crystaltechno Ltd.

Advantageously, to improve the mechanical resistance, the insert comprising an outer face and an inner face, it includes a mechanical and/or chemical protection layer on the outer face and possibly on the inner face.

The mechanical and/or chemical protection layer (preferably a single-layer or multilayer coating) can be chosen from among at least one of the following layers:

a layer comprising a zinc sulfide (notably ZnS) in particular on an insert of $ZnS_xSe_{1-x}$, notably ZnSe, for mechanical protection, a diamond layer, preferably amorphous for its properties of adhesion to the crystal of the insert, notably with a thickness of at least 10 nm or 20 nm and preferably from 50 nm to 300 nm and even at most 100 nm, a DLC ("diamond-like carbon") layer, that is to say a layer based on carbon of diamond type, preferably amorphous, notably with a thickness of at least 10 nm or 20 nm and preferably from 50 nm to 300 nm and even at most 100 nm.

The addition of a sufficiently thin layer of ZnS on ZnSe does not degrade the transmission and guarantees a resistance to erosion comparable to bulk ZnS. An example product is TUFTRAN™ from the company Rohm & Haas.

For example, the material such as $ZnS_xSe_{1-x}$ (including ZnS) can be coated with a layer of ZnS to protect it against acids and other specific solvents like methanol, etc.

As an alternative to ZnS, it is therefore possible to deposit, for example by chemical vapor deposition (notably PECVD) or vapor phase deposition (VPD), a diamond layer (or a DLC layer) without degrading the transmission and guaranteeing an even greater resistance to erosion. An example of production is described in the publication by Osipkov and others IOP conf. Ser. Material Science and Engineering 74 (2015) 012013. The insert can therefore be coated with a functional top layer (scratch-resistant, anti-fogging, etc.) of different refractive index, n is the index of the material of dominant thickness.

The insert can be flat with parallel inner and outer faces, at most 2°.

The inner face of the insert can be flush with the inner face of the glazing or be set back by at most 5 mm.

On the inner face of the glazing (F2 or F4 if laminated glazing) there can be glued a plate, notably with a thickness of 1 to 3 mm, and even 1.5 to 2.5 mm. It is for example made of plastic, possibly reinforced (fibers etc.), for example polycarbonate (PC), polymethyl methacrylate (PMMA), polyethylene (PE), polypropylene (PP), polyamide (PA66), acrylonitrile butadiene styrene (ABS), and the alloys thereof ABS-PC, polystyrene (PS), acrylonitrile styrene acrylate (ASA) based on polymer of formaldehyde (polyoxymethylene POM), polybrominated terphenyl (PBT), preferably filled with glass fibers for even greater strength, notably PA66 GF30 (30% glass fibers).

This plate can be used to fix the thermal camera and/or a housing. It can be holed in line with said through-hole.

It can also bear elements functional elements, for example a camera in the visible and/or a Lidar or any other sensor (rain, brightness, etc.). It has as many holes as necessary for the or the sensors (hole for the visible camera, for LIDAR etc.).

The glazing according to the invention can be a laminated glazing, notably a vehicle windshield (road vehicle, motor vehicle in particular), in particular bent, comprising a first sheet of glass with said inner main face called F1 and an opposite main face (called F2) and a second sheet of glass with said outer main face called F4 on the inside of the vehicle interior (and the opposite main face F3), the first and second sheets of glass being linked by an interlayer, notably acoustic and/or tinted, made of a polymer material, notably organic (notably thermoplastic).

In particular, the laminated glazing comprises:
a first sheet of glass, possibly clear, extra clear or tinted, notably gray or green, preferably bent, forming outer glazing, with first and second main faces, respectively called face F1 and face F2, in the case of a motor vehicle with a thickness preferably of at most 2.5 mm, even at most 2 mm—notably 1.9 mm, 1.8 mm, 1.6 mm and 1.4 mm—or even at most 1.3 mm or at most 1 mm,
an interlayer, possibly clear, extra clear or tinted, notably gray or green, made of polymer material, preferably thermoplastic or even better of polyvinylbutyral (PVB), preferably, in the case of a motor vehicle, with a thickness of at most 1.8 mm, better at most 1.2 mm and even at most 0.9 mm (and, better, at least 0.3 mm and even at least 0.6 mm), notably set back from the rim of the first glazing by at most 2 mm and set back from the rim of a second glazing by at most 2 mm, the interlayer possibly having a cross section reducing in form at the wedge from top to bottom of the laminated glazing (in particular a windshield),
a second glazing, made of mineral glass, preferably bent and preferably clear or extra clear, even tinted, forming internal glazing, with third and fourth main faces, in the case of a motor vehicle, with a thickness preferably less than that of the first glazing, even at most 2 mm—notably 1.9 mm, 1.8 mm, 1.6 mm and 1.4 mm—or even at most 1.3 mm or at most 1 mm, the thickness of the first and second glazings being preferably strictly less than 4 mm, even than 3.7 mm.

The inner and/or outer glass can be neutral (without coloring), or (lightly) tinted, notably gray or green, such as the glass TSA from the company Saint-Gobain Glass. The inner and/or outer glass can have undergone a chemical or heat treatment of hardening, annealing or tempering type (for a better mechanical strength in particular) or be semi-tempered.

Without departing from the scope of the invention, the interlayer can of course comprise several layers of thermoplastic material of different kinds, for example different hardnesses, to ensure an acoustic function, as for example described in the publication U.S. Pat. No. 6,132,882, notably a set of layers of PVB of different hardnesses. Likewise, one of the sheets of glass can be thinner than the thicknesses conventionally used.

The interlayer can, according to the invention, be wedge-shaped, notably for an HUD (Head Up Display) application. Also, one of the layers of the interlayer can be tinted throughout.

As standard interlayer, in addition to PVB, materials that can be cited include flexible used polyurethane PU, a thermoplastic without plasticizer such as the ethylene/vinyl acetate (EVA) copolymer, an ionomer resin. These plastics have, for example, a thickness of between 0.2 mm and 1.1 mm, notably 0.3 and 0.7 mm.

The interlayer can comprise another functional plastic film (transparent, clear or tinted), for example a film of poly(ethylene terephthalate) PET supporting an athermal, electroconductive etc. layer, for example PVB/functional film/PVB between the faces F2 and F3.

The transparent plastic film can have a thickness of between 10 and 100 μm. The transparent plastic film can, more broadly, be made of polyamide, polyester, polyolefin (PE: polyethylene, PP: polypropylene), polystyrene, polyvinyl chloride (PVC), polyethylene terephthalate (PET), polymethyl methacrylate (PMMA), polycarbonate (PC). A clear film is preferred, notably PET.

it is possible, for example, to use a clear film of coated PET, for example XIR from the company Eastman, a coextruded film of PET-PMMA, for example of SRF 3M® type, but also many other films (for example of PC, PE, PEN, PMMA, PVC), which are visually as transparent as possible and are not modified in the autoclave with respect to their surface and their consistency.

In order to limit the heating in the vehicle interior or limit the use of conditioned air, at least one of the sheets of glass (preferably the outer glass) is tinted, and the laminated glazing can also include a layer that reflects or absorbs the solar radiation, preferably on face F4 or on face F2 or F3, in particular a transparent layer of electroconductive oxide, called TCO layer (on face F4) or even a stack of thin layers including at least one TCO layer, or stacks of thin layers including at least one layer of silver (on F2 or F3), the or each layer of silver being disposed between dielectric layers.

(Silver) layer on face F2 and/or F3 and TCO layer on face F4 can be combined.

The TCO layer (a transparent electroconductive oxide) is preferably a layer of fluorine-doped tin oxide ($SnO_2$:F) or a mixed layer of indium and tin oxide (ITO).

Naturally, the most sought-after application is for the glazing to be a windshield of a road vehicle (motor vehicle) or even rail vehicle (at moderate speed).

The glazing according to the invention can comprise at least one sheet of glass comprising, on a main face, an opaque layer (masking layer), notably an enamel (black, etc.) at the border of the through-hole (so as to mask the camera or cameras for example).

The laminated glazing according to the invention can comprise a first sheet of glass comprising, on a main face (for example the face F2), an opaque layer (masking layer), notably an enamel (black, etc.) at the border of the through-hole (so as to mask the camera or cameras for example) and/or a second sheet of glass comprising, on a main face (for example the face F3 or F4), an opaque layer (masking layer), notably an enamel (black, etc.) at the border of the through-hole (so as to mask the camera or cameras for example).

It is also possible to provide a masking layer on at least one of the main faces of the interlayer, notably PVB.

The invention also relates to a vehicle, notably an autonomous or semi-autonomous vehicle, incorporating said device as defined previously.

The invention relates also to an optimization method for forming the device as defined previously in which, for a camera with given θ, p (even an inclination α' of X' with respect to the horizontal that is imposed or adjustable), a smallest possible insert height $D_{min}$ is determined (with n and/or e possibly imposed or adjustable), preferably at most 20 mm or 15 mm (if possible), satisfying the case a) and the insert height Di≥$D_{min}$ is chosen such that $(y_F - y_{C0}) \geq 0.5p/2$ (50% of the pupil in the triangle), and preferably $(y_F - y_{C0}) \geq 0.7p/2$, $(y_F - y_{C0}) \geq 0.8p/2$, $(y_F - y_{C0}) \geq 0.9p/2$, $(y_F - y_{C0}) \geq p/2$ (100% of the pupil in the triangle).

To arrive at the case $D_{min}$, it is possible to adjust h, w even α' and even n and e.

The invention also relates to an optimization method for forming the device as defined previously in which, for a given insert height Di (with n and/or e possibly imposed or adjustable), for a camera with given p (even an inclination α' of X' to the horizontal imposed or adjustable), a $\theta_{min}$ is determined that is the smallest possible and preferably at most 40°, 35° (if possible) satisfying the case a) and θ≥θmin is chosen such that $(y_F - y_{C0}) \geq 0.5p/2$, and preferably $(y_F - y_{C0}) \geq 0.7p/2$, $(y_F - y_{C0}) \geq 0.8p/2$, $(y_F - y_{C0}) \geq 0.9p/2$, $(y_F - y_{C0}) \geq p/2$.

To arrive at the case $\theta_{min}$, it is possible to adjust h, w even α', and even n and e.

The invention relates finally to an optimization method for forming the device as defined previously in which, for a given insert height Di (with n and/or e possibly imposed or adjustable) and for a camera with given θ and(/or) p (even an inclination α' of X' to the horizontal imposed or adjustable) an $h_{min}$ is determined that is the smallest possible satisfying the case a) and h≥$h_{min}$ is chosen such that $(y_F - y_{C0}) \geq 0.5p/2$, and preferably $(y_F - y_{C0}) \geq 0.7p/2$, $(y_F - y_{C0}) \geq 0.8p/2$, $(y_F - y_{C0}) \geq 0.9p/2$, $(y_F - y_{C0}) \geq p/2$.

To arrive at the case $h_{min}$, it is possible to adjust w, even α' (and θ if not imposed), and even n and e.

Some advantageous but nonlimiting embodiments of the present invention are described hereinbelow, which can of course be combined with one another if necessary.

Figure 1:
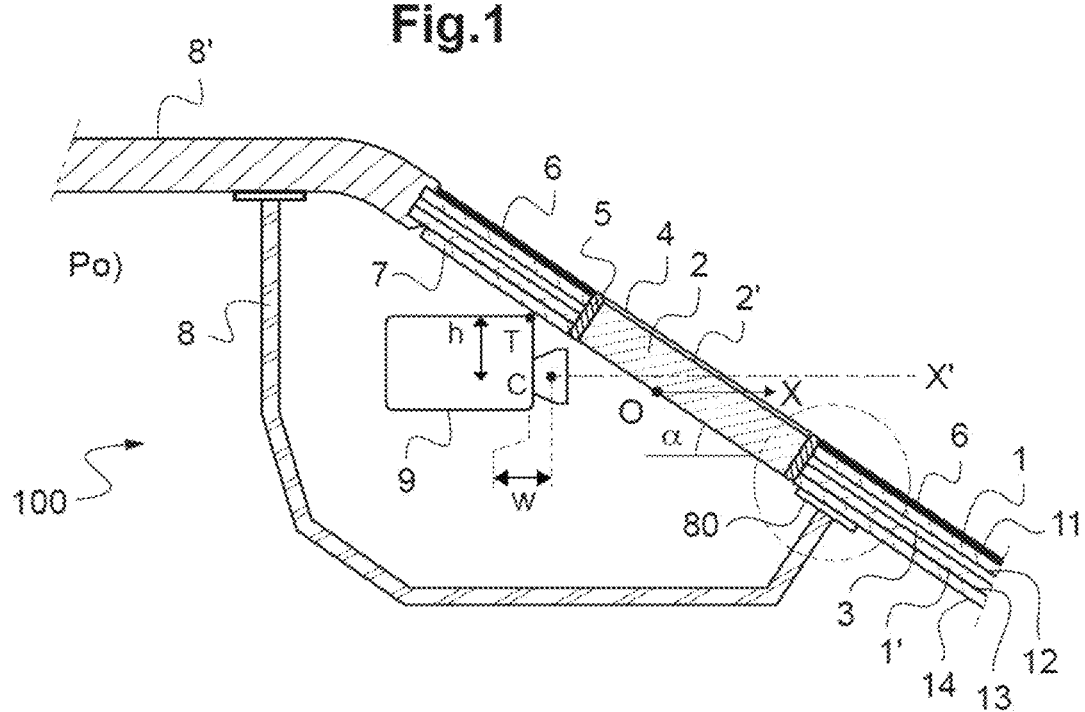

FIG. 1 schematically represents a vehicle with a device 100 comprising a windshield with an insert and a thermal camera in the vehicle interior, this is a partial cross-sectional view in a plane P0 passing through the center C of the pupil of the camera and a center O of the insert.

Figure 2:
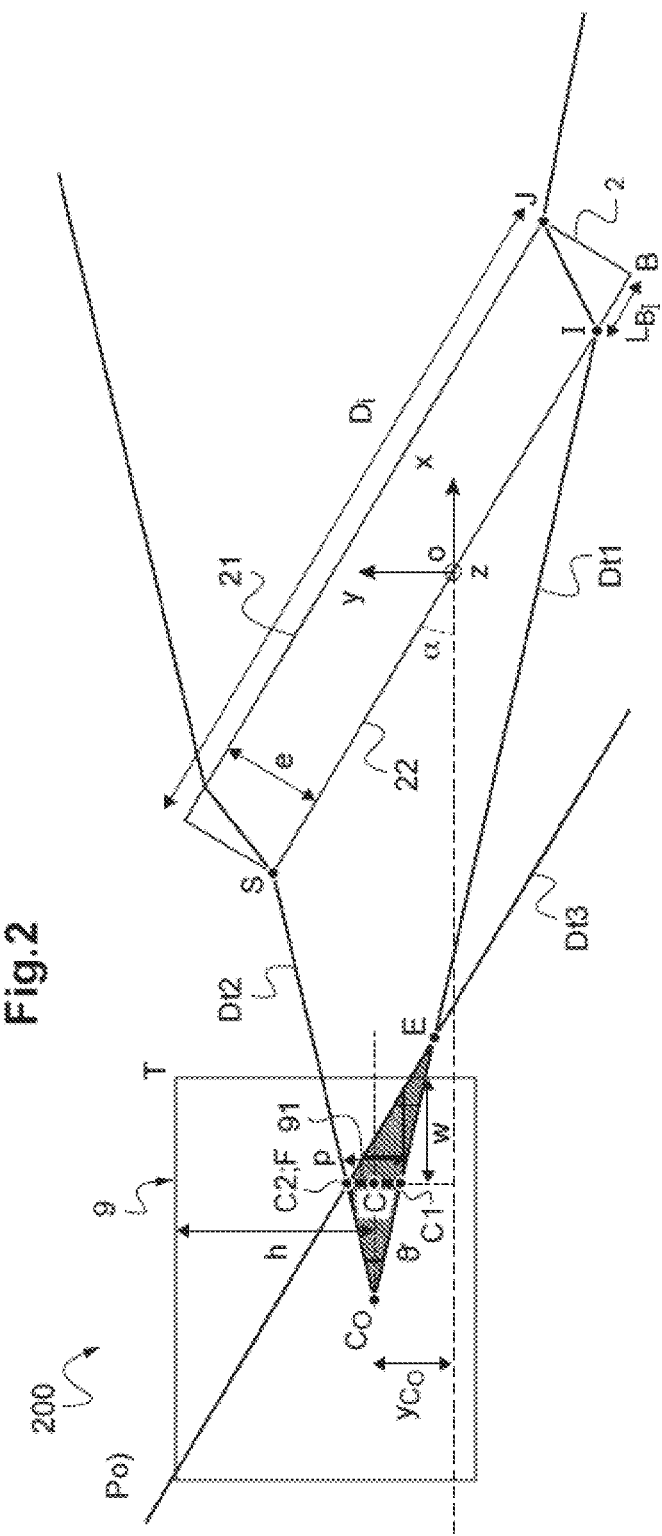

FIG. 2 schematically represents the insert and thermal camera of FIG. 1 with the parameters (coordinates, etc.) that are influential for the optimized positioning of the camera, this is a partial cross-sectional view in a plane P0 passing through the center C of the pupil of the camera and a center O of the insert.

FIG. 3 schematically represents the insert and the thermal camera of FIG. 1 with exemplified parameters (example 1) that are influential for the optimized positioning of the camera, this is a partial cross-sectional view in a plane P0 passing through the center C of the pupil of the camera and a center O of the insert.

FIGS. 3' and 3" represent diagrams of the lighting of the infrared sensor of the thermal camera, in gray level for the example 1 and a counter-example 1'.

FIG. 4 schematically represents the insert and the thermal camera of FIG. 1 with exemplified parameters (example 2) that are influential for the optimized positioning of the camera, this is a partial cross-sectional view in a plane P0 passing through the center C of the pupil of the camera and a center O of the insert.

FIG. 4' represents a diagram of the lighting of the infrared sensor of the thermal camera, in gray level for the example 2.

FIG. 5 schematically represents the insert and the thermal camera of FIG. 1 with exemplified parameters (example 3) that are influential for the optimized positioning of the camera, this is a partial cross-sectional view in a plane P0 passing through the center C of the pupil of the camera and a center O of the insert.

FIG. 5' represents a diagram of the lighting of the infrared sensor of the thermal camera, in gray level for the example 3.

FIGS. 6a and 6b respectively represent the variation of the ordinate y and of the negative abscissa x of the points C0, E, F as a function of θ for the case a) and the case b).

FIGS. 7a and 7b respectively represent the variation of the ordinate y and of the negative abscissa x of the points C0, E, F as a function of Di for the case a) and the case b).

FIGS. 8a and 8b respectively represent the variation of the ordinate y and of the negative abscissa x of the points C0, E, F as a function of α for the case a) and the case b).

FIGS. 9a and 9b respectively represent the variation of the ordinate y and of the negative abscissa x of the points C0, E, F as a function of h for the case a) and the case b).

FIGS. 10a and 10b respectively represent the variation of the ordinate y and of the negative abscissa x of the points C0, E, F as a function of n for the case a).

FIG. 1 schematically represents a windshield 100 according to the invention, in cross section with a thermal camera 9 placed behind the windshield facing a zone which is preferably situated in the central and upper part of the windshield. In this zone, the camera can be oriented with a certain angle with respect to the horizontal. In this example, the camera is horizontal. In particular, the lens and the infrared camera are oriented directly toward the image input zone, according to a direction parallel to the ground.

The windshield is a conventional laminated glazing comprising:

an outer sheet of glass 1, preferably tinted, for example made of TSA glass and 2.1 mm thick, with an outer face F1 and an inner face F2, and an inner sheet of glass 1' (or, as a variant, a sheet of plastic), for example TSA glass (or clear or extra clear glass) and 2.1 mm thick or even 1.6 mm or even less, with outer face F3 and inner face F4 on the vehicle interior side, the two sheets of glass being linked to one another by an interlayer made of thermoplastic material 3, more often than not of polyvinylbutyral (PVB), preferably clear, of submillimetric thickness, possibly having a cross section reducing in wedge form from top to bottom of the laminated glazing, for example a PVB (RC41 from Solutia or Eastman), approximately 0.76 mm thick, or as a variant, if necessary, an acoustic PVB (three-layer or four-layer), for example approximately 0.81 mm thick, for example an interlayer made of three PVB layers.

Conventionally and as is well known, the windshield is obtained by hot-laminating elements 1, 1' and 3.

The windshield 100 comprises, on the outer face 11 for example (or preferably on F2 12 and/or on face F3 13 or F4 14), preferably an opaque coating, for example black 6, such as a layer of enamel or of black lacquer, over all the surface of the glazing disposed facing the device incorporating the thermal camera (therefore over all the perimeter of the hole), including its housing 8 (plastic, metal, etc.), so as to hide the later. The housing 8 can be fixed to a plate 7 glued to the face F4 by a glue 80 and to the roof 9.

The opaque layer 6 can extend beyond the zone with the insert. Possibly, the (lateral) extension of the opaque layer forming a strip at the top border of the through-hole so that the windshield has a (black) opaque strip along the top longitudinal edge, even a (black) opaque frame over all the periphery.

According to the invention, in the peripheral zone facing the camera, the windshield comprises a through-hole 4 between the inner face 11 and the outer face 14, the hole being delimited by a lateral wall 10 of the laminated glazing (glass 1/PVB 3/glass 1'), said through-hole comprising:

an insert 2 made of a material that is transparent in a range A of wavelengths in the infrareds which goes at least from 9.5 to 10.5 µm and preferably from 8 to 12 µm, the insert being of given thickness e, between the insert and the side wall, means for fixing the insert, notably in the form of a ring 5 made of flexible material, polymer, the fixing means being notably glued to the side wall.

The material of the insert 2 is also transparent in the visible at a reference wavelength lying between 500 nm and 600 nm.

It can be transparent in the visible at least in a range B going from 550 to 600 nm.

The material of the insert 2 exhibits an infrared transmission of at least 50% and, better, at least 65% in said range A and a light transmission of at least 30% and, better, at least 40% at the reference wavelength and, better, in the range B. The material of the insert 2, preferably polycrystalline, is chosen from among:

a compound of zinc including selenium and/or sulfur, or a compound including a fluoride of barium.

A particular choice is:

a compound including a multispectral zinc sulfide, in particular obtained after hot isostatic pressing, notably including selenium, such as $ZnS_xSe_{1-x}$, with x preferably at least 0.97, in particular multispectral ZnS, or a compound including a zinc selenide, in particular ZnSe, notably including sulfur, such as $ZnSe_yS_{1-y}$ with y at least 0.97, a compound including a fluoride of barium, notably including calcium and/or strontium, notably $Ba_{1+j}Ca_jSr_iF_2$ with i and j preferably at most 0.25 or even $Ba_{1-i}Ca_iF_2$ with i preferably at most 0.25, in particular $BaF_2$.

The insert 2 comprises an outer face 21 and an inner face 22 and it comprises, here, preferably, a mechanical and/or chemical protection layer 2' on the outer face and possibly on the inner face. This is a coating chosen from among a layer comprising a zinc sulfide, a diamond layer or a DLC layer.

Preferably, a multispectral ZnS can be chosen that is bare or covered with a protective layer of zinc sulfide or a ZnSe covered by a protective layer of zinc sulfide.

The through-hole 4 can alternatively be a notch, therefore a through-hole preferably opening on the roof side.

The through-hole (and the insert) can be in another region of the windshield or even in another glazing of the vehicle.

The glazing of the vehicle can be monolithic.

The insert is of given thickness e, notably from 3 to 10 mm, made of a material of refractive index n in the range A, notably from 1.35 to 4.5.

The insert is preferably of circular or quasi-circular form, the input face fitting within a rectangle or square of width Wi and height Di with aspect ratio Di/Wi of at least 0.8 and at most 1.1, with Di>Wi, defining a center O which is the intersection of the diagonals of said rectangle.

The so-called thermal camera 9 comprises a circular input pupil 91, with a height p, (generally diameter) and an infrared detection system in the range A and a lens, the camera being defined by:

an optical axis X' passing through the center C of the pupil, C facing the insert, a vertical viewing angle θ of at least 10°, 20° and in particular at most 70°, 60°.

The camera is of given volume defined by a point of contact T (wedge/upper-end plane of the lens/in front of or behind the lens) here capable of first touching a plate 7 made of plastic on the inner face of the glazing, for example of 1.5 mm, with a hole in line with the through-hole 4. This plate can be used to fix the camera 9.

The orthogonal reference frame (O, X, Y, Z) is defined in which X is an axis parallel to the optical axis X', oriented toward the outer face, Z is the axis normal to the optical axis, the axis Y is normal to X in the plane containing P0 oriented toward the top of glazing, Z is normal to P0.

T is in a plane P0 passing through O and C (or Tv, called virtual point of contact, is defined as being the projection of T in said plane P0), w is the distance according to X, algebraic in the plane P0 of T or Tv and h is the distance according to Y in the plane P0 between C and T or Tv; the input face 21 of the insert having an inclination defined by an angle α with respect to X and of at least 20°, 30°, 35°, 40° and up to 60°, even 90° or 80° with respect to the horizontal, in particular X' being at most 20° with respect to the horizontal.

FIG. 2 schematically represents the insert and the thermal camera of FIG. 1 with the parameters (coordinates, etc.) that are influential for the optimized positioning of the camera 9, this is a partial cross-sectional view in a plane P0 passing through the center C of the pupil of the camera and a center O of the insert 2.

In relation to FIG. 2, three limit conditions are defined
Condition on the Top Radius (Via Dt2)
The limit case corresponds to the slope straight line $$\tan\left(\frac{\theta}{2}\right) \quad \text{[Math 16]}$$

and which passes through the point S of coordinates:

$$x_S = -\frac{D_i}{2}\cos\alpha \quad \text{[Math 17]}$$

and $$y_S = \frac{D_i}{2}\sin\alpha \quad \text{[Math 18]}$$

therefore, straight line Dt2 of equation:

$$y = \tan\left(\frac{\theta}{2}\right)x + \frac{D_i}{2}\left[\cos\alpha\tan\left(\frac{\theta}{2}\right) + \sin\alpha\right] \quad \text{[Math 19]}$$

This is the limit case, the condition is if observed under this straight line Dt2, therefore:

$$y < \tan\left(\frac{\theta}{2}\right)x + \frac{D_i}{2}\left[\cos\alpha\tan\left(\frac{\theta}{2}\right) + \sin\alpha\right] \quad \text{[Math 20]}$$

Condition on the Bottom Radius (Dt1)
Take the slope straight line $$-\tan\left(\frac{\theta}{2}\right) \quad \text{[Math 21]}$$

and which passes through the point I, whose coordinates must be found using the Descartes laws. Let $i_1$ be the angle of incidence of the radius on the inner face of the insert, then (because the sum of the angles of a triangle equal to pi):

$$i_1 = \frac{\pi+\theta}{2} - \alpha, \quad \text{[Math 22]}$$

let $i_2$ be the angle of the radius in the insert of optical index n, then $$i_2 = \sin^{-1}\left(\frac{1}{n}\sin i_1\right). \quad \text{[Math 23]}$$

Now take the coordinates of the point B:

$$x_B = \frac{D_i}{2}\cos\alpha \quad \text{[Math 24]}$$

and $$y_B = -\frac{D_i}{2}\sin\alpha \quad \text{[Math 25]}$$

and the distance between the point B and the point I which is:

$$L_{BI} = e\tan i_2 \text{ with } e \text{ the thickness of the insert.} \quad \text{[Math 26]}$$

Then $$\vec{OI} = \vec{OB} + \vec{BI} \quad \text{[Math 27]}$$

which makes it possible to calculate the coordinates of the point I:

$$x_I = \frac{D_i}{2}\cos\alpha - L_{BI}\cos\alpha \quad \text{[Math 28]}$$

and $$y_I = -\frac{D}{2}\sin\alpha + L_{BI}\sin\alpha \quad \text{[Math 29]}$$

i.e., according to the parameters of the system:

$$x_I = \frac{D_i}{2}\cos\alpha - \frac{\frac{e}{n}\cos\alpha\cos\left(\alpha-\frac{\theta}{2}\right)}{\sqrt{1-\frac{1}{n^2}\cos^2\left(\alpha-\frac{\theta}{2}\right)}} \quad \text{[Math 30]}$$

$$y_I = -\frac{D_i}{2}\sin\alpha + \frac{\frac{e}{n}\sin\alpha\cos\left(\alpha-\frac{\theta}{2}\right)}{\sqrt{1-\frac{1}{n^2}\cos^2\left(\alpha-\frac{\theta}{2}\right)}} \quad \text{[Math 31]}$$

which makes it possible to give the equation of the straight line Dt1:

$$y = -\tan\left(\frac{\theta}{2}\right)x + \frac{\left(\cos\alpha\tan\left(\frac{\theta}{2}\right)-\sin\alpha\right)\left[D_i\sqrt{1-\frac{1}{n^2}\cos^2\left(\alpha-\frac{\theta}{2}\right)}-2\frac{e}{n}\cos\left(\alpha-\frac{\theta}{2}\right)\right]}{\left(2\sqrt{1-\frac{1}{n^2}\cos^2\left(\alpha-\frac{\theta}{2}\right)}\right)} \quad \text{[Math 32]}$$

In the same way as previously, this is the limit case and it is important to be above this straight line Dt1 therefore:

$$y > -\tan\left(\frac{\theta}{2}\right)x + \frac{\left(\cos\alpha\tan\left(\frac{\theta}{2}\right)-\sin\alpha\right)\left[D_i\sqrt{1-\frac{1}{n^2}\cos^2\left(\alpha-\frac{\theta}{2}\right)}-2\frac{e}{n}\cos\left(\alpha-\frac{\theta}{2}\right)\right]}{2\sqrt{1-\frac{1}{n^2}\cos^2\left(\alpha-\frac{\theta}{2}\right)}} \quad \text{[Math 33]}$$

The most favorable case (rear vertex of the triangle, denoted $C_0$) has the coordinates (point secant between the straight line dt1 and the straight line dt2):

$$x_{C0} = -\frac{\sin\alpha\left[D_i\sqrt{1-\frac{1}{n^2}\cos^2\left(\alpha-\frac{\theta}{2}\right)}-\frac{e}{n}\cos\left(\alpha-\frac{\theta}{2}\right)\right]+\frac{e}{n}\cos\alpha\tan\left(\frac{\theta}{2}\right)\cos\left(\alpha-\frac{\theta}{2}\right)}{2\tan\left(\frac{\theta}{2}\right)\sqrt{1-\frac{1}{n^2}\cos^2\left(\alpha-\frac{\theta}{2}\right)}} \quad \text{[Math 34]}$$

$$y_{C0} = \tan\left(\frac{\theta}{2}\right)x_{C_o} + \frac{D_i}{2}\left[\cos\alpha\tan\left(\frac{\theta}{2}\right)+\sin\alpha\right] \quad \text{[Math 35]}$$

Even in the asymptotic case in which e is very small (limit e tends toward 0) the following applies:

$$\lim_{e\to 0} y_{C0} = \frac{D_i}{2}\cos\alpha\tan\left(\frac{\theta}{2}\right) \quad \text{[Math 36]}$$

Now, since $$0 < \alpha < \frac{\pi}{2} \text{ and} \quad \text{[Math 37]}$$

$$0 < \frac{\theta}{2} < \frac{\pi}{2} \text{ the following clearly applies in all cases} \quad \text{[Math 38]}$$

$$y_{C0} > 0 \quad \text{[Math 39]}$$

which justifies this upward shift of the optical center of the camera.

Mechanical Condition

Let h be the height between the center C of the pupil and the "wedge which touches" denoted T and w the horizontal distance between the center of this pupil and the "wedge which touches"

now, the equation of the straight line Dt3 is:

$$y = -\tan(\alpha)(x+w) - h \quad \text{[Math 40]}$$

This is the equation of the limit case, the condition is realized if:

$$y \leq -\tan(\alpha)(x+w) - h \quad \text{[Math 41]}$$

Since the aim is to find the position of retraction of the camera (in x) which satisfies the other criteria, it is more eloquent to express the condition on x as a function of y:

$$x = w - \frac{y-h}{\tan(\alpha)} \quad \text{[Math 42]}$$

-continued $$x < w - \frac{y-h}{\tan(\alpha)} \quad \text{[Math 43]}$$

In particular, in the case where $y = y_{C0}$ $$x_{(y=y_{C0})} < w - \frac{y_{C0}-h}{\tan(\alpha)} \quad \text{[Math 44]}$$

w can be positive and negative (but generally fairly small as an absolute value) and x is always negative given the orientation of the axes.

The reference point for the position of the camera is the position of the point C which is the center of the input pupil of the camera but for the entire field of the camera to be used without shadow on the edges, all of the pupil of height p should be within the triangle formed by the three straight lines Dt1, Dt2 and Dt3.

Coordinates of the Point F $$x_F = -\frac{D_I\cos\alpha\tan\frac{\theta}{2}+D_I\sin\alpha+2w\tan\alpha+2h}{2\left(\tan\alpha+\tan\frac{\theta}{2}\right)} \quad \text{[Math 45]}$$

$$y_F = \tan\left(\frac{\theta}{2}\right)x_F + \frac{D_i}{2}\left[\cos\alpha\tan\left(\frac{\theta}{2}\right)+\sin\alpha\right] \quad \text{[Math 46]}$$

Coordinates of the Point E $$x_E = -\frac{\left(\cos\alpha\tan\left(\frac{\theta}{2}\right)-\sin\alpha\right)\left[D_i\sqrt{1-\frac{1}{n^2}\cos^2\left(\alpha-\frac{\theta}{2}\right)}-2\frac{e}{n}\cos\left(\alpha-\frac{\theta}{2}\right)\right]}{2\sqrt{1-\frac{1}{n^2}\cos^2\left(\alpha-\frac{\theta}{2}\right)}} + \frac{w\tan\alpha+h}{\tan\alpha-\tan\frac{\theta}{2}} \quad \text{[Math 47]}$$

$$y_E = -\tan(\alpha)(x_E+w) - h \quad \text{[Math 48]}$$

EXAMPLES

FIG. 3 schematically represents the insert and the thermal camera of FIG. 1 with Exemplified Parameters (Example 1) that are Influential for the Optimized Positioning of the camera 9, this is a partial cross-sectional view in a plane P0 passing through the center C of the pupil of the camera and a center O of the insert 2.

FIGS. 3' and 3" represent diagrams of the lighting of the infrared sensor of the thermal camera, in gray level for the example 1 and a counter-example 1'.

The parameters are given in table 1.

TABLE 1

| | |
|---|---|
| θ | 24 |
| α | 33 |
| n | 2.2 |
| e | 5 |
| D | 20 |
| h | 7 |
| w | 1 |
| xc | −16.5 |
| yc | 2.21 |
| N | 3 |
| f | 6.8 mm |
| p | 2.27 |

C is placed in the triangle EFC0 with $y_C = y_{C0} = 2.2$ mm and $x_C$ is equal to −16.5 mm.

C1, the lowest point of the pupil, is on the straight line Dt1 with $y_{C1} = 1.07$ mm C2, the highest point of the pupil, is on the straight line Dt1 with $y_{C2} = 3.34$ mm The coordinates of E are −11.09; −0.45
The coordinates of F are −17.27; 3.56
The abscissa of C0 is $x_{C0} = -23.6$ mm
As w is positive then T is on the front-end plane of the camera The diagram of the lighting of the sensor (from the outside) is uniform (the white is the max illumination from the homogeneous outside).

In a counter-example 1' with $y_C = 0$ and it is clearly shown that all the bottom of the image is lost (see black part in the bottom part of FIG. 3").

In terms of effective lower vertical field of view downward, there is a change from 8° to 12° therefore there is a gain of 4° by placing the camera such that $y_{C0} = 2.2$ mm and not by centering it on the axis X.

That corresponds to a heightwise vision gain of approximately 2 m for an object/a living being at 30 m from the windshield.

FIG. 4 schematically represents the insert and the thermal camera of FIG. 1 with exemplified parameters (example 2) that are influential for the optimized positioning of the camera, this is a partial cross-sectional view in a plane P0 passing through the center C of the pupil of the camera and a center O of the insert.

FIG. 4' represents a diagram of the lighting of the infrared sensor of the thermal camera, in gray level for the example 2.

With respect to the example 1, only the input datum p is modified and is 5.67 mm, the pupil is too large to fit entirely in the triangle C0FE, centering is optimized to have a maximum fraction of the pupil fit. There is shadow at the top and the bottom of the image on the sensor (see black parts in FIG. 4').

FIG. 5 schematically represents the insert and the thermal camera of FIG. 1 with exemplified parameters (example 3) that are influential for the optimized positioning of the camera, this is a partial cross-sectional view in a plane P0 passing through the center C of the pupil of the camera and a center O of the insert 2.

FIG. 5' represents a diagram of the lighting of the infrared sensor of the thermal camera, in gray level for the example 3.

The parameters are given in table 2

TABLE 2

| | |
|---|---|
| θ | 30° |
| α | 33° |
| n | 2.2 |
| e | 5 mm |
| Di | 20 mm |
| h | 10 mm |
| w | 1 mm |
| $x_C$ | −21 mm |
| $y_C$ | 2.63 mm |
| N | 1.3 |
| f | 6.8 mm |
| p | 5.23 mm |

The camera is too bulky and has a large θ. That corresponds to the case b) for which the point T is fairly set back and the triangle according to a) (C above Dt1 and under Dt2) no longer exists.

A choice is made to place C td $y_C = y_{C0}$ and as close as possible to the curve Dt1.

FIG. 5' represents a diagram of the lighting of the infrared sensor of the thermal camera, in gray level for the example 3.

Although there are dark zones at the top and the bottom of the image, those if have been minimized by the proposed placement. That corresponds also to an equal compromise between shadow at the top and at the bottom.

FIGS. 6a and 6b respectively represent the variation of the ordinate y and of the negative abscissa x of the points C0, E, F as a function of θ for the case a) and the case b).

FIGS. 7a and 7b respectively represent the variation of the ordinate y and of the negative abscissa x of the points C0, E, F as a function of Di for the case a) and the case b).

FIGS. 8a and 8b respectively represent the variation of the ordinate y and of the negative abscissa x of the points C0, E, F as a function of α for the case a) and the case b).

FIGS. 9a and 9b respectively represent the variation of the ordinate y and of the negative abscissa x of the points C0, E, F as a function of h for the case a) and the case b).

FIGS. 10a and 10b respectively represent the variation of the ordinate y and of the negative abscissa x of the points C0, E, F as a function of n for the case a).

The parameters are given in table 3

TABLE 3

| | |
|---|---|
| θ | 24° |
| α | 30° |
| n | 2.2 |
| e | 5 mm |
| Di | 20 mm |
| h | 7 mm |
| w | 1 mm |
| N | 3 |
| f | 6.8 mm |
| p | 2.26 mm |

On each of the graphs of FIGS. 6a to 10b, the point of intersection R (for y) and R' (for x) of the curves gives the moment where the triangle ceases to exist (tilting toward the case b):

when θ is too large, the case b) applies
when Di is too small, the case b) applies
when α is too small, the case b) applies
or when h is too large, the case b) applies.

In particular, for the case a) on all the graphs:
for C0: $y_{C0}$ from 0.8 mm to 3.2 mm and $x_{C0}$ −40 mm to −10 mm for E: $y_E < 4/3$ mm xE at least −20 mm and at most 3 mm
and for F: $y_F < 7$ mm $x_F$−25 mm to −10 mm.
for the case b):
$y_{C0}$ goes from 1 mm to 3 mm.

The invention claimed is:

1. A device, comprising:
a vehicle glazing of given thickness E1, the vehicle glazing having an outer main face oriented outward and an inner main face on a vehicle interior side, the vehicle glazing comprising, in a peripheral zone, a through-hole between the inner main face and the outer main face, the through-hole being delimited by a side wall of the vehicle glazing,
in said through-hole, an insert made of a material that is transparent in a range A of wavelengths in an infrared spectrum beyond 2.5 µm, ranging at least from 9.5 to 10.5 µm, the insert being of given thickness e, made of a material of refractive index n in the range A, with an input face oriented toward the vehicle interior and an output face, the input face fitting within a rectangle or square of width Wi and height Di with aspect ratio Di/Wi of at least 0.8 and of at most 1.2, with Di at most 35 mm, defining a center O which is an intersection of the diagonals of said rectangle,
a thermal camera, disposed on the inner main face side so as to receive an electromagnetic radiation after passing through said insert, the thermal camera comprising an input pupil, with a height p, and an infrared detection system in a range A and a lens, the camera being defined by:
an optical axis X' passing through a center C of the pupil, C facing the insert,
a vertical viewing angle θ of at least 10°,
the thermal camera being of given volume defined by a point of contact T capable of touching the vehicle glazing first, or a plate on the inner main face of the vehicle glazing, or the insert, or a piece in a peripheral environment of said vehicle glazing, in position mounted in a vehicle,
an orthogonal reference frame (O, X, Y, Z) is defined in which X is an axis parallel to the optical axis X', oriented toward the outer main face, Z is an axis normal to the optical axis, the axis Y is normal to X in a plane containing P0 oriented toward a top of the vehicle glazing, Z is normal to P0
T being in a plane P0 passing through O and C or Tv, which is a virtual point of contact, is defined as being a projection of T in said plane P0, w being the distance according to X and algebraic in the plane P0 from T or Tv and h is a distance according to Y in the plane P0 between C and T or Tv, the input main face of the insert having an inclination defined by an angle α with respect to X,
wherein a first straight line Dt1 is defined $$y = -\tan\left(\frac{\theta}{2}\right)x + \frac{\left(\cos\alpha\tan\left(\frac{\theta}{2}\right) - \sin\alpha\right)\left[D_i\sqrt{1 - \frac{1}{n^2}\cos^2\left(\alpha - \frac{\theta}{2}\right)} - 2\frac{e}{n}\cos\left(\alpha - \frac{\theta}{2}\right)\right]}{2\sqrt{1 - \frac{1}{n^2}\cos^2\left(\alpha - \frac{\theta}{2}\right)}} \quad \text{[Math 49]}$$

a second straight line Dt2 is defined $$y = \tan\left(\frac{\theta}{2}\right)x + \frac{D_i}{2}\left[\cos\alpha\tan\left(\frac{\theta}{2}\right) + \sin\alpha\right] \quad \text{[Math 50]}$$

Dt1 and Dt2 are secant at C0 ($x_{C0}$, $y_{C0}$) with $$x_{c_o} = -\frac{\sin\alpha\left[D_i\sqrt{1 - \frac{1}{n^2}\cos^2\left(\alpha - \frac{\theta}{2}\right)} - \frac{e}{n}\cos\left(\alpha - \frac{\theta}{2}\right)\right] + \frac{e}{n}\cos\alpha\tan\left(\frac{\theta}{2}\right)\cos\left(\alpha - \frac{\theta}{2}\right)}{2\tan\left(\frac{\theta}{2}\right)\sqrt{1 - \frac{1}{n^2}\cos^2\left(\alpha - \frac{\theta}{2}\right)}} \quad \text{[Math 51]}$$

$$y_{C0} = \tan\left(\frac{\theta}{2}\right)x_{C0} + \frac{D_i}{2}\left[\cos\alpha\tan\left(\frac{\theta}{2}\right) + \sin\alpha\right] \quad \text{[Math 52]}$$

a third straight line Dt3 is defined $$y = -\tan(\alpha)(x+w) - h \quad \text{[Math 53]}$$

Dt1 and Dt3 are secant at E($x_E, y_E$),
Dt2 and Dt3 are secant at F($x_F, y_F$)

$$x_F = -\frac{D_i\cos\alpha\tan\frac{\theta}{2} + D_i\sin\alpha + 2w\tan\alpha + 2h}{2\left(\tan\alpha + \tan\frac{\theta}{2}\right)} \quad \text{[Math 54]}$$

$$y_F = \tan\left(\frac{\theta}{2}\right)x_F + \frac{D_i}{2}\left[\cos\alpha\tan\left(\frac{\theta}{2}\right) + \sin\alpha\right] \quad \text{[Math 55]}$$

-continued $$\frac{\left(\cos\alpha\tan\left(\frac{\theta}{2}\right)-\sin\alpha\right)\left[D_i\sqrt{1-\frac{1}{n^2}\cos^2\left(\alpha-\frac{\theta}{2}\right)}-2\frac{e}{n}\cos\left(\alpha-\frac{\theta}{2}\right)\right]}{2\sqrt{1-\frac{1}{n^2}\cos^2\left(\alpha-\frac{\theta}{2}\right)}}+$$ [Math 56]

$$x_E=-\frac{w\tan\alpha+h}{\tan\alpha-\tan\frac{\theta}{2}}$$

$$y_E=-\tan(\alpha)(x_E+w)-h$$ [Math 57]

$x_C$ being a negative value, $y_C$ being a positive value, wherein
in a case a)

$$y_F > y_{C0} > y_E$$

$C(x_C, y_C)$ is inside a triangle of vertices $C0(x_{C0}, y_{C0})$ $F(x_F, y_F)$ and $E(x_E, y_E)$, at least 50% of the pupil being positioned in said triangle by including E; or
in a case b)
when $$|x_{C0}| < |x_F|$$ [Math 58]

then $y_C < (y_{C0}+5 \text{ mm})$
a point K of intersection is then defined between a straight line $y=y_{C0}$ and Dt3 therefore $$x_K = w - \frac{y_{C0}-h}{\tan(\alpha)}$$ [Math 59]

$$y_K = y_{C0}$$ [Math 60]

$$|x_K - x_{C0}| < 10 \text{ mm.}$$ [Math 61]

2. The device as claimed in claim 1, wherein, in the case a), at least 70% or 80% or 90% of the pupil is positioned in said triangle C0FE by including E.

3. The device as claimed in claim 1, wherein, in the case a), $-(y_{C0}-2 \text{ mm}) < y_C < (y_{C0}-0.5 \text{ mm})$ and $(x_F-5 \text{ mm}) < x_C < (x_F+2 \text{ mm})$.

4. The device as claimed in claim 1, wherein $$y_C < 10 \text{ mm}$$ [Math 62]

and/or $$|x_C| < 5 \text{ cm.}$$ [Math 63]

5. The device as claimed in claim 1, wherein θ is at least 20°.

6. The device as claimed in claim 1, wherein Di is at most 20 mm.

7. The device as claimed in claim 1, wherein X' forms an angle of at most 20°, 10° with the horizontal and/or at most an angle equal to θ/2±2°.

8. The device as claimed in claim 1, wherein the material of the insert is germanium, zinc sulfide.

9. The device as claimed in claim 1, wherein the material of the insert exhibits an infrared optical transmission of at least 50% in said range A and a light transmission of at least 30% at a reference wavelength lying between 500 nm and 600 nm.

10. The device as claimed in claim 1, wherein the material of the insert is chosen from among:
a compound of zinc comprising selenium and/or sulfur, or
a compound comprising a barium fluoride.

11. The device as claimed in claim 1, wherein the vehicle glazing forms a laminated glazing, the laminated glazing comprising a first sheet of glass with said inner face and an opposite face and a second sheet of glass or plastic with said outer face on an internal side of the vehicle interior, the first sheet of glass and the second sheet of glass or plastic being linked by an interlayer.

12. A vehicle comprising said device as claimed in claim 1.

13. An optimization method for forming the device defined as claimed in claim 1, comprising, for a camera with θ, p, given, determining both a smallest possible insert height $D_{min}$, satisfying the case a), and the insert height $Di \geq D_{min}$ is chosen such that $(y_F-y_{C0}) \geq 0.5p/2$.

14. An optimization method for forming the device defined as claimed in claim 1, comprising, for a given insert height Di, for a camera with given p, determining a smallest possible θmin, satisfying the case a) and θ≥θmin is chosen such that $(y_F-y_{C0}) \geq 0.5p/2$.

15. An optimization method for forming the device defined as claimed in claim 1, comprising, for a given insert height Di and for a camera with given θ, p, determining a smallest possible $h_{min}$ that satisfies the case a) and $h \geq h_{min}$ is chosen such that $(y_F-y_{C0}) \geq 0.5p/2$.

16. The device as claimed in claim 1, wherein the vehicle glazing is a motor vehicle or rail car glazing.

17. The device as claimed in claim 1, wherein the peripheral zone is in an upper part of the glazing.

18. The device as claimed in claim 1, wherein the infrared spectrum is from 8 to 12 µm.

19. The device as claimed in claim 1, wherein the insert is circular.

20. The device as claimed in claim 1, wherein Di>Wi.

* * * * *